(12) United States Patent
Araki et al.

(10) Patent No.: US 6,506,486 B1
(45) Date of Patent: Jan. 14, 2003

(54) MAGNETIC RECORDING MEDIUM

(75) Inventors: Hiroaki Araki, Kanagawa (JP); Mikio Ohno, Kanagawa (JP)

(73) Assignee: Fuji PhotoFilm Co., Ltd., Kanagawa (JP)

( * ) Notice: Subject to any disclaimer, the term of this patent is extended or adjusted under 35 U.S.C. 154(b) by 0 days.

(21) Appl. No.: 09/655,632

(22) Filed: Sep. 5, 2000

(30) Foreign Application Priority Data

Sep. 7, 1999 (JP) ............................................ 11-252476

(51) Int. Cl.⁷ ............................ G11B 5/706; G11B 5/71
(52) U.S. Cl. .................... 428/323; 428/402; 428/425.9; 428/694 BG; 428/694 BP; 428/694 BA
(58) Field of Search ............................... 428/323, 402, 428/694 B, 694 BG, 694 BH, 694 BY, 694 BN, 694 BB, 900, 425.9, 694 BP, 694 BA

(56) References Cited

U.S. PATENT DOCUMENTS

| | | | |
|---|---|---|---|
| 5,376,465 A | * 12/1994 | Saibara et al. | ......... 428/694 TP |
| 5,496,607 A | * 3/1996 | Inaba et al. | ............... 428/65.3 |
| 5,527,603 A | 6/1996 | Isobe et al. | |
| 5,534,361 A | * 7/1996 | Hisano et al. | ........ 428/694 RE |
| 5,587,860 A | * 12/1996 | Umebayashi et al. | ....... 360/133 |
| 6,139,937 A | * 10/2000 | Sato et al. | .................. 428/141 |

FOREIGN PATENT DOCUMENTS

| | | |
|---|---|---|
| JP | 62-8331 | 1/1987 |
| JP | 08-306031 | 11/1996 |

* cited by examiner

*Primary Examiner*—Paul Thibodeau
*Assistant Examiner*—Kevin M Bernatz
(74) *Attorney, Agent, or Firm*—Stroock & Stroock & Lavan LLP

(57) ABSTRACT

A magnetic recording medium having little head staining and favorable dropout and error rates when recording after extended or high-temperature and -humidity storage. The medium has, on a nonmagnetic support, a magnetic layer of coated ferromagnetic metal powder containing Fe and binder. The ferromagnetic metal powder contains at least Al, Co and Y, and, respectively, has ratios of Al to Fe (Al/Fe) ranging from 5 to 15% by atom, Co to Fe (Co/Fe) from 1 to 25% by atom, and Y to Fe (Y/Fe) ranging from 0.5 to 5% by atom. Si and Nd either are absent or are each found in an amount not more than 0.01% by atom with respect to Fe. The magnetic layer contains a fatty acid and a fatty acid ester, the fatty acid ester being a fatty alkyl ester compound having an acid-hydrolytic speed not more than 0.03/hour

16 Claims, No Drawings

MAGNETIC RECORDING MEDIUM

BACKGROUND OF THE INVENTION

1. Field of the Invention

This invention relates to a magnetic recording medium, especially, a particulate magnetic recording medium for broadcasting and computers, which is required to have high reliability and preservability.

2. Description of Related Art

A magnetic recording medium has been widely known as a tape for recording, a video tape, a computer tape, a disc and the like. A recording medium has been subjected to high densification year after year and the recording wavelength becomes shorter, moreover, the recording systems have also spread from analogue systems to digital systems.

Especially, a magnetic recording medium in which a ferromagnetic metal powder containing Fe as a main component is coated on a nonmagnetic support with a binder is mainly used, currently, as a medium for broadcasting, videos and data recording because of its excellent cost performance. These magnetic recording media for broadcasting, videos and date recording are required to have high electromagnetic characteristics as well as recorded images and data are provided to consumers as products. Therefore, they are required to have preservation characteristics that they can survive severe use under various environmental conditions compared with common consumer use, tapes are not degenerated and recorded data can be reproduced without problems even if used for a long time.

When providing a magnetic recording medium having ferromagnetic metal powder, it is known that it is desirable to make the material containing the metal less prone to oxidation. Through techniques such as modifying slow oxidation (Japanese Unexamined Patent Publication (KOKAI) Showa No. 57-89401, Japanese Unexamined Patent Publication (KOKAI) Showa No. 2-54998 and the like), and modifying added elements (U.S. Pat. No. 789,063 and the like), the magnetic material can itself be made more resistant to oxidation, and therefore, more stable In this manner, a sufficient level of resistance to oxidation can be practically achieved It is also necessary that a magnetic tape have certain running properties so as to avoid problems. For example, where a tape is used after having been stored for a long period of time, or at high temperature an d high humidity, a large amount of adhesive may be deposited on the recording head, in which case dropouts and the error rate may increase and, in extreme cases, head clogging may occur, necessitating cleaning of the head. Such problems following long-term tape storage or storage under adverse conditions may be particularly common in magnetic recording systems which are used for broadcasting, video recording, or data recording, because in such systems the relative speed between the tape and head is large, meaning a large area of tape is used over time.

SUMMARY OF THE INVENTION

It is an object of the present invention to provide a magnetic recording medium having excellent preservability, especially, to provide a magnetic recording medium in which head stains generated by a tape are few and a dropout and an error rate are low in recording with a drive after preservation for a long time or after preservation under high temperature and high humidity even if the tape is used for a system in which a relative speed between a tape and a head is large and a large area of a tape is used per unit time.

The object of the present invention is accomplished by the following magnetic recording medium of the present invention.

That is, the present invention relates to a magnetic recording medium comprising a nonmagnetic support having thereon, a magnetic layer containing a ferromagnetic metal powder, a fatty acid, a fatty acid ester and a binder, wherein said ferromagnetic metal powder comprises Fe and 5 to 15% by atom of Al, 1 to 25% by atom of Co, 0.5 to 5% by atom of Y, 0 to 0.1% by atom of Si and 0 to 0.1% by atom of Nd, based on Fe and wherein said fatty acid ester is a fatty acid alkyl ester having an acid-hydrolytic speed equal to or less than 0.03/hour.

As described above, the magnetic recording medium of the present invention has an advantage that head stains resulted from running with a drive after preservation for a certain period are reduced by using a ferromagnetic metal powder having a specific composition and a fatty acid ester having a specific physical property.

MODE FOR CARRYING OUT OF THE INVENTION

Preferred embodiments of the present invention will be explained below.

A ferromagnetic metal powder used in the present invention contains Fe as a main component, and at least Al, Co and Y wherein a ratio of Al to Fe (Al/Fe) ranges from 5 to 15% by atom, a ratio of Co to Fe (Co/Fe) ranges from 1 to 25% by atom and a ratio of Y to Fe (Y/Fe) ranges from 0.5 to 5% by atom. Moreover, the ferromagnetic metal powder used in the present invention should be free from Si and Nd, or if contained, each of Si and Nd could be contained in an amount equal to or less than 0.1% by atom with respect to Fe.

The ferromagnetic metal powders having the above-mentioned composition are those in which the surface characteristics are controlled so as to maintain an excellent absorption of a binder. That is, by giving the above-mentioned composition, a binder is made to adsorb tightly to the ferromagnetic metal powder and a dynamic strength of a magnetic coating film is made tough. As a result, falling or the like of the magnetic layer itself when a head slides at a high speed can be prevented. An amount of a binder absorbed to a ferromagnetic metal powder can be increased and an amount of a binder not absorbed to a ferromagnetic metal powder in a coating film can be reduced. Since the binder not absorbed to the magnetic particles easily appears to a surface of the magnetic layer in a drying process, troubles such as head clog generated in sliding with a head can be reduced by reducing such a binder.

Among the above-mentioned elements contained in the ferromagnetic metal powder, it is considered that Al exists in the relatively neighborhood of the surface of the ferromagnetic metal powder. Therefore, Al easily influences on absorption characteristics between the ferromagnetic metal powder and the binder, in addition, Al also controls the hardness of the ferromagnetic metal powder. If the ratio of Al to Fe (Al/Fe) increases, the binding force between the ferromagnetic metal powder and the binder becomes large, however, it is not preferable that the ratio exceeds 15% by atom because the ferromagnetic metal powder itself becomes excessively hard so that a bead-wear increases. In addition, if the ratio of Al to Fe (Al/Fe) is less than 5% by atom, the binding force between the ferromagnetic metal powder and the binder becomes small and head clog easily occurs. The ratio of Al to Fe (Al/Fe) preferably ranges from 7 to 13% by atom.

It is to be noted that if Si is contained instead of Al or with Al, head stains in running after preservation under high temperature and high humidity remarkably occur. Since $SiO_2$ and a mixed oxide of $SiO_2$ and $Al_2O_3$ are known as a solid acid catalyst, it is attributed to that if Si is contained in the ferromagnetic metal powder, hydrolyzing of an organic material used in the magnetic recording medium together with the ferromagnetic metal powder is promoted. Therefore, the ferromagnetic metal powder free from Si is used in the present invention or if contained, Si content is to be in an amount equal to or less than 0.1% by atom with respect to Fe. Preferably, the ferromagnetic metal powder not containing Si is used.

Among the above-mentioned elements contained in the ferromagnetic metal powder, Y is important next to Al. A magnetic recording medium using a ferromagnetic metal powder containing IIIa group elements (including Lanthanoids) including Y is already known (referring to, for example, Japanese Unexamined Patent Publication (KOKAI) Heisei No. 6-36265, U.S. Pat. Nos. 5,527,603 and 5,795,645, Japanese Unexamined Patent Publication (KOKAI) Heisei No. 8-306031). The present inventors examined effects of using the ferromagnetic metal powder containing these IIIa group elements. As a result, the magnetic recording medium using the ferromagnetic metal powder containing Y is the most preferred from the viewpoint that head stains after preservation under high temperature and high humidity are few. However, there is a problem that if the ratio of Y to Fe (Y/Fe) is less than 0.5% by atom, the desirable effect does not appear, and if exceeding 0.5% by atom, the preventing effect for sintering is excessively high so that the ferromagnetic metal powder having desirable magnetic characteristics is hardly obtained. The ratio of Y to Fe (Y/Fe) is preferably in the rang e of from 1 to 4% by atom.

However, it is revealed that if Nd is contained in the ferromagnetic metal powder with Y or instead of Y, head stains in running after preservation under high temperature and high humidity remarkably occur. This is attribute d to the difference in chemical functions resulting from the difference in outer shell electrons between Y and Nd, however, the details are not known. Therefore, the ferromagnetic metal powder free from Nd is used in the present invention or, if contained, Nd content is to be in an amount equal to or less than 0.1% by atom with respect to Fe. Preferably, the ferromagnetic metal powder not containing Nd is used.

The ferromagnetic metal powder used in the present invention contains Co and the ration of Co to Fe (Co/Fe) ranges from 1 to 25% by atom. It is considered that oxides on the surface might be changed to cobalt ferrite by incorporation of Co. However, if Co is contained in an amount exceeding 25% by atom, the magnetic characteristics are lowered, as a result, electromagnetic characteristics are also lowered, thereby it is not preferable. In addition, if Co is contained in an amount less than 1% by atom, the effect for containing Co cannot be sufficiently obtained. The amount of Co is preferably in the range of from 1 to 5% by atom.

The ferromagnetic metal powder used in the present invention preferably has a mean length of major axis ranging from 0.05 to 0.25 µm, more preferably from 0.1 to 0.2 µm. If the mean length of major axis is equal to or less than 0.25 µm, entanglements between magnetic particles each other are relatively few, good dispersing can be obtained, the surface roughness is small and excellent electromagnetic characteristics can be obtained. In addition, such a phenomenon hardly occurs as electromagnetic characteristics are hardly obtained within the range having the recording wavelength about equal to or less than 0.7 µm by an axial length effect (length loss). On the contrary, if the mean length of major axis is less than 0.05 µm, the magnetic particles become excessively fine, thereby durability may be deteriorated.

The ferromagnetic metal powder used in the present invention preferably has the specific surface area (Sbet) ranging from 40 to 60 $m^2/g$. If the specific surface area is equal to or less than 60 $m^2/g$, the number of voids in the metal powder is not large so that paint-making becomes easy without difficulties due to a large viscosity in paint-making. If t he specific surface area is equal to or higher than 40 $m^2/g$, a particle does not become excessively large and a particle having a mean length of major axis equal to or less than 0.25 µm can be also easily obtained.

The shape of the ferromagnetic metal powder may be an acicular shape, a spindle shape, a sphere shape, a cubical shape, a plate shape or the like. An acicular shape and a spindle shape are preferred and a spindle shape is more preferred. A spindle shape here means a shape in which in a cross-section shape on a plane containing a major axis of a particle (in which the length is referred to as r1), a length in the direction perpendicular to the major axis has the maximum value (r2) in a center part of the major axis and gradually decreases from there to the edge and then closes on the edge. The axis ratio (r1/r2) is preferably in the range of from 5 to 10.

The reason why a ferromagnetic metal powder having a spindle shape is preferred is that it is such a uniform particle as to have a good particle size distribution and small branching. Therefore, the dispersibility and the orientation property are improved. In addition, the spindle-shaped particle is easily subjected to paint-making because of having a small number of voids.

As for a producing method for a ferromagnetic metal powder containing Fe as a main component, several methods have been known. The one using industrially is a method in which an iron oxide or an iron oxide containing water prepared in a wet reaction are produced by heat reduction in a reductive gas. The ferromagnetic metal powder containing Fe as a main component of the present invention can be produced by using a method which is industrially used.

The ferromagnetic metal powder is preferably subjected to slow oxidation treatment in order to form an oxide coated film on a surface. The slow oxidation treatment may be, for example, such a method as to dry after dipping in an organic solvent, such a method as to dry after dipping in an organic solvent and then forming an oxide coated film with feeding an oxygen-containing gas, and such a method as to form an oxide coated film on a surface with adjusting a partial pressure of oxygen gas and an inert gas without using an organic solvent. However, it is preferable to carry out in a gas-phase reaction because a uniform oxide coated film can be formed and magnetic characteristics under high temperature and high humidity are hardly changed.

It is appropriate that a crystallite size of the ferromagnetic metal powder used in the present invention usually ranges approximately from 12 to 22 nm, preferably from 13 to 18 nm. It is appropriate that a saturation magnetization (σs) usually ranges approximately from 100 to 180 emu/g, preferably from 120 to 160 emu/g. A pH is preferably optimized by a combination with a binder used. It ranges from 4 to 12, however, it is appropriate that it preferably ranges from 7 to 11.

The ferromagnetic metal powder of the present invention preferably contains water in an amount of from 0.1 to 2.0% by weight. A ferromagnetic metal powder containing moisture can be obtained by making the ferromagnetic metal powder to contact with water or a steam containing gas.

The ferromagnetic metal powder used in the present invention preferably contains as a small amount of impurities as possible. Especially, it is preferable that a content of water-soluble Na ranges from 0 to 10 ppm/1 g and a content of water-soluble Ca ranges from 0 to 10 ppm/1 g. It is because these easily make metal soaps or the like during preservation by associating with organic materials used in a magnetic tape, and then this metal soaps are deposited on a tape surface to give an adverse influence to running performance.

It is to be noted that a content of water-soluble Na and Ca in the ferromagnetic metal powder is measured using an atomic absorption spectroscopy with respect to Na, and an ICP (Inductively Coupled Plasma Spectrometry) with respect to Ca. In the measurement, a filtrate is used which is obtained by that 5 g of the ferromagnetic metal powder are mixed with 100 ml of distilled water and extracted for an hour followed by filtration of the resulting supernatant.

The ferromagnetic metal powder used in the present invention may be treated in advance with a dispersant, a lubricant, a surfactant, an antistatic agent or the like described below. It is specifically described in Japanese Patent Publication (KOKOKU) Showa No. 44-14090, Japanese Patent Publication (KOKOKU) Showa No. 45-18372, Japanese Patent Publication (KOKOKU) Showa No. 47-22062, Japanese Patent Publication (KOKOKU) Showa No. 47-22513, Japanese Patent Publication (KOKOKU) Showa No. 46-28466, Japanese Patent Publication (KOKOKU) Showa No. 46-38755, Japanese Patent Publication (KOKOKU) Showa No. 47-4286, Japanese Patent Publication (KOKOKU) Showa No. 47-12422, Japanese Patent Publication (KOKOKU) Showa No. 47-17284, Japanese Patent Publication (KOKOKU) Showa No. 47-18509, Japanese Patent Publication (KOKOKU) Showa No. 47-18573, Japanese Patent Publication (KOKOKU) Showa No. 39-10307, Japanese Patent Publication (KOKOKU) Showa No. 48-39639, U.S Pat. No. 3,026,215, U.S. Pat. No. 3,031,341, U.S. Pat. No. 3,100,194, U.S. Pat. No. 3,242,005, U.S. Pat. No. 3,389,014 and the like.

A fatty acid ester used in the magnetic recording medium of the present invention is a fatty acid alkyl ester compound having an acid-hydrolytic speed equal to or less than 0.03 /hour. The term "acid-hydrolytic speed" refers to "k", an assumed artificial primary reaction speed used in the equation $lnC_0/C=kt$ (in which C represents a primary concentration and $C_0$ represents a concentration after time t (hour) passed) at a hydrolytic speed in 0.1 N-HCl/water/aceton (water:aceton=1:20 by volume ratio)at 40° C. A fatty acid ester having a large acid-hydrolytic speed easily decomposes into a fatty acid and an alcohol during storage at high temperature and high humidity, in which case and a hydrolyzed fatty acid is deposited on a surface of a magnetic tape. In addition, it is assumed that the fatty acid ester generates fatty acid metal salts through a reaction with a magnetic material or impurities (ions) during a hydrolyzing process, which causes clogging and/or head staining. A magnetic layer also contains a fatty acid, however, a fatty acid metal salt which causes such clogging and/or head staining is hardly generated from the fatty acid, so that it is considered that an intermediate which easily becomes a fatty acid metal salt is generated during a hydrolyzing process of the fatty acid ester. It has been determined that in order to make it possible and practical to use such materials following preservation without problems, the acid-hydrolytic speed is to be equal to or less than 0.03 /hour. It is to be noted that the lower limit of the acid-hydrolytic speed is 0 /hour.

It is preferable that the above-mentioned fatty acid ester exists approximate to a surface of the magnetic recording medium in an appropriate amount. For this, preferable are a fatty acid ester represented by the structure formula $R^1$ $COOR^2$ (wherein $R^1$ represents a straight-chain saturated or unsaturated hydrocarbon group and $R^2$ represents a branched saturated or unsaturated hydrocarbon group). As for the straight-chain saturated or unsaturated hydrocarbon group represented by $R^1$, hydrocarbon groups having a carbon number of from 13 to 21, such as a tridecyl group, a pentadecyl group, a heptadecyl group, a nonadecyl group, an oleyl group, a residue of linoleic acid, elaidic acid and the like can be exemplified. In addition, as for the branched saturated or unsaturated hydrocarbon group, hydrocarbon groups having a carbon number of from 3 to 21, such as a 1-methylbutyl group, 2-ethylhexyl group, 2-hexyldecyl group, 3-methylbutyl group and the like can be exemplified.

Furthermore, as for the fatty acid ester represented by $R^1$ $COOR^2$, 2-ethylhexyl stearate, 2-hexyldecyl stearate, 3-methylbutyl stearate, 1-methylbutyl stearate, 2-ethylhexyl myristate, 2-hexyldecyl myristate, 3-methylbutyl myristate, 1-methylbutyl myristate and the like can be exemplified.

Furthermore, the above-mentioned fatty acid ester preferably has a melting point equal to or less than 15° C. If the melting point of the fatty acid ester exceeds 15° C., the fatty acid ester is deposited on the surface of the magnetic recording medium in using or preserving under low temperature, thereby causing running inferiority. It is to be noted that the melting point here is measured from a differential calorie balance in decreasing a temperature at a constant speed with DSC (Differential Scanning Calorimeter). As for the fatty acid ester having a melting point equal to or higher than 15° C., 2-ethylhexyl stearate, 2-hexyldecyl stearate, 3-methylbutyl stearate, 1-methylbutyl stearate, 2-ethylhexyl myristate, 2-hexyldecyl myristate, 3-methylbutyl myristate, 1-methylbutyl myristirate and the like can be exemplified.

In the present invention, a fatty acid is contained in a magnetic layer in addition to the above-mentioned fatty acid alkyl ester. As for the fatty acid, preferable are monobasic fatty acids having a carbon number of 10 to 24 which may contain an unsaturated bond or bonds or may be branched. Specific examples include lauric acid, myristic acid, palmitic acid, stearic acid, behenic acid, oleic acid, linoleic acid, linolenic acid, elaidic acid and the like.

As for the binder used in the present invention, conventionally publicly known thermoplastic resins, thermosetting resins, reactive type resins and a mixture thereof are used. The thermoplastic resin is the one having a glass transition temperature ranging from −20 to 90° C., a number average molecular weight ranging from 1,000 to 200,000, preferably from 10,000 to 100,000 and a degree of polymerization ranging from about 50 to 1,000. Examples of such binders include polymers or copolymers containing the following compounds as a constituting unit, such as vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal and vinyl ether; polyurethane resins and various rubber based resins. In addition, examples of thermosetting resins or reactive type resins include phenol resins, epoxy resins, polyurethane thermosetting type resins, urea resins, melamine resins, alkyd resins, acrylic based reactive resins, formaldehyde resins, silicone resins, epoxy-polyamide resins, a mixture of polyester resin and isocyanate prepolymer, a mixtures of polyesterpolyol and polyisocyanate, a mixture of polyurethane and polyisocyanate and the like. The details about these resins are described in "Plastic Handbook", published by Asakura Shoten. Moreover, publicly known electron radiation curing resins can be used.

The resins mentioned above can be used alone or in combination. As the preferred resins, a combination of polyurethane resins and at least one resin selected from vinyl chloride resins, vinyl chloride-vinyl acetate copolymers, vinyl chloride-vinyl acetate-vinyl alcohol copolymers, vinyl chloride-vinyl acetate-maleic anhydride copolymers, or these resins combined with polyisocyanate can be exemplified. As the structure of the polyurethane resin, publicly known resin such as polyester-polyurethane, polyether-polyurethane, polyether-polyester-polyurethane, polycarbonate-polyurethane, polyester-polycarbonate-polyurethane, polycaproractone-polyurethane, polyolefin-polyurethane or the like can be used.

With respect to all binders mentioned here, those are preferably used in which at least one selected from $-COOM$, $-SO_3M$, $-OSO_3M$, $-P=O(OM')_2$, $-O-P=O(OM')_2$ (where M represents a hydrogen atom or an alkali metal atom and M' represents a hydrogen atom, alkali metal atom or a lower hydrocarbon group), $-OH$, $-NR_2$, $=N^+R_3$ (where R represents an hydrocarbon group having a carbon number of from 1 to 12), an epoxy group, $-SH$, $-CN$, sulfobetain, carboxybetain, phosphobetain or the like, preferably $-COOM$, $-SO_3M$, $-OSO_3M$, $-P=O(OM')_2$ are introduced to at least one of polyurethane resin and vinyl chloride based resin through copolymerization or addition reaction, if necessary, to obtain further excellent dispersibility and durability.

Specific examples of these binders used in the present invention include VAGH, VYHH, VMCH, VAGF, VAGD, VROH, VYES, VYNC, VMCC, XYHL, XYSG, PKHH, PKHJ, PKHC, and PKFE manufactured by Union Carbide Corporation; MPR-TA, MPR-TA5, MPR-TAL, MPR-TSN, MPR-TMF, MPR-TS, MPR-TM, and MPR-TAO manufactured by Nissin Kagaku Kogyo K. K.; 1000W, DX80, DX81, DX82, DX83, and 100FD manufactured by Denki Kagaku Kogyo K. K.; MR-104, MR-105, MR110, MR100, and 400X-110manufactur ed by Nippon Zeon Co., Ltd.; Nippollan N2301, N2302, and N2304 manufactured by NIPPON POLYURETHANE Co., Ltd.; Pandex T-5105, T-R3080, T-5201, Burnock D-400, D-210-80, Crisvon6109, and 7209 manufactured by Dainippon Ink And Chemicals, Incorporated.; Vylon UR8200, UR8300, UR8600, UR5500, UR4300, RV530, and RV280 manufactured by Toyobo Co., Ltd.; Diaipheramine 4020, 5020, 5100, 5300, 9020, 9022, and 7020 manufactured by Dainichiseika Color & Chemicals Mfg. Co.,.Ltd.; MX 5004 manufactured by Mitsubishi Kasei Corporation; Sunprene SP-150, TIM-3003, and TIM-3005 manufactured by Sanyo Chemical Industries Co., Ltd.; Salan F310 and F210 manufactured by Asahi Chemical Industry Co., Ltd., and the like. Among those above, preferable are MR-104 and MR110.

As for isocyanates used in the present invention, isosyanates such as tolylene diisocyanate, 4,4'-diphenylmethane diisosyanate, hexamethylene diisocyanate, xylylene diisosyanate, naphtylene-1,5-diisosyanate, o-toluidine di isosyanate, isophorone diisocyanate, triphenylmethane triisocyanate or the like, products of these isocyanates with polyalcohols, polyisocyanates producted by condensation of isocyanates or the like can be used. These isocyanates are commercially available under the following trade names; Coronate L, Coronate HL, Coronate 2030, Coronate 2031, Millionate MR, and Millionate MTL manufactured by Nippon Polyurethane Industry Co.,Ltd.; Takenate D-102, Takenate D-110N, Takenate D-200, and Takenate D-202 manufactured by Takeda Chemical Industries Co.Ltd.; Desmodule L, Desmodule IL, Desmodule N, and Desmodule HL manufactured by Sumitomo Bayer Co.Ctd., and so on. These can be used alone, or in combination of two or more.

Binders used in the magnetic layer of the present invention are used in an amount ranging from 10 to 30% by weight, preferably from 15 to 25% by weight with respect to a ferromagnetic metal powder. Especially, a combination of a vinyl chloride based resin, a polyurethane resin and a polyisocyanate is preferably used. When these three components are jointly used, the vinyl chloride based resin is used in an amount of ranging from 5 to 20% by weight, preferably from 7 to 15% by weight, the polyurethane resin is used in an amount ranging from 2 to 15% by weight, preferably from 4 to 10% by weight and the polyisocyanate is used in an amount ranging from 2 to 20% by weight, preferably from 3 to 10% by weight. The total amount of the three components ranges from 10 to 30% by weight, preferably from 15 to 25% by weight. Thereby, a tough magnetic layer is obtained by dispersing a ferromagnetic metal powder sufficiently in a vinyl chloride based resin, giving softness to a magnetic layer with a polyurethane resin and making a magnetic layer to be cross-linked with a polyisocyanate.

In the present invention, the most preferable ones as the polyurethane are polyurethanes containing as main components a diol component consisting of polyether polyol and polyester polyol and a polyisocyanate component.

In the magnetic layer of the present invention, one or more nonmagnetic inorganic powders having a abrasive effect are preferably added. The inorganic powder preferably has the Mohs' scale of hardness equal to or higher than 5 and the average particle diameter ranging from 0.05 to 0.4 $\mu$m, more preferably the average particle diameter ranging from 0.1 to 0.3 $\mu$m. Two or more inorganic powders can be also used in combination. After the inorganic powder is dispersed in advance with a little amount of binders, a coating liquid can be prepared by mixing it with a liquid in which a magnetic material or the like is dispersed, or a coating liquid can be prepared by further dispersing after mixing.

The tap density of the nonmagnetic inorganic powder is from 0.05 to 2 g/ml, preferably from 0.2 to 1.5 g/ml. The moisture content of the inorganic powder is from 0.05 to 5% by weight, preferably from 0.2 to 3% by weight. The specific surface area (Sbet) of the inorganic powder is from 1 to 100 $m^2$/g, preferably from 5 to 50 $m^2$/g. The oil absorption amount utilizing dibutyl phthalate (DBP) is from 5 to 100 ml/100g, preferably from 10 to 80 ml/100g. The specific gravity is from 1 to 12, preferably from 3 to 6. The shape may be any one of an acicular shape, sphere shape, polygon shape, and plate shape.

As for kinds of these inorganic powders, $Al_2O_3$, $Cr_2O_3$, $Fe_2O_3$, $ZrO_2$, $TiO_2$ and the like can be exemplified. In addition, its surface may be subjected to surface treatment with $Al_2O_3$, $SiO_2$, $TiO_2$, $ZrO_2$, $SnO_2$, $Sb_2O_3$, ZnO. Especially, if using $Al_2O_3$, $SiO_2$, $TiO_2$, $ZrO_2$, good dispersibility is obtained. These may be used either in combination or alone. Moreover, a surface-treated layer prepared by coprecipitation may be used in view of the purpose. The surface treatment may be covering with alumina, followed by covering its surface layer with silica and vice versa. The surface-treated layer may be a porous layer according to the purpose, but it is preferably homogeneous and dense in general.

Specific examples of the inorganic powders used in the magnetic layer of the present invention include Nanotite manufactured by Showa Denko K.K.; Hit-100, Hit82, Hit70, Hit60A, Hit50, AKP20, AKP30, AKP50 and ZA-G1 manufactured by Sumitomo Chemical Co.Ltd.; ERC-DBM, HP-DBM, HPF-DBM, HPFX-DBM, HPS-DBM and HPSX-DBM manufactured by Reynolds Co.Ltd.; WA8000 and WA1000 manufactured by Fujimi Kenmazai Co.Ltd.; UB20, UB40B and Mecanox U4 manufactured by Uemura Kogyo Co. Ltd.; UA2055, UA5155 and UA5305 Showa Keikinzoku Co.Ltd., G-5, Cromex M, Cromex S1, Cromex U2, Cromex U1 and Cromex KX10 manufactured by Nippon Chemical Industrial Co. Ltd.; ND803, ND802 and ND801 manufactured by Nippon Denko Co.Ltd.; F-1, F-2 and UF-500 manufactured by Toso Co.Ltd.; DPN-250, DPN-250BX, DPN-245, DPN-270BX, TF-100, TF-120, TF-140, DPN-550BX and TF-180 manufactured by Toda Kogyo Corporation; A-3 and B-3 manufactured by Showa Kogyo Co.Ltd.; Beta-SiC and UF manufactured by Central Glass Co.Ltd.; Beta-random standard and Beta-random ultra fine manufactured by Ibiden Co.Ltd.; JR-401 and MT500B manufactured by Teikoku Kako Co.Ltd.; TY-50, TTO-51B, TTO-55A, TTO-55B, TTO-55C, TTO-55S, TTO-55D, SN-100, E270 and E271 manufactured by Ishihara Sangyo Co.Ltd.; STT-4D, STT-30D, STT-30 and STT-65C manufactured by Titan Kogyo K. K.; MT-100S, MT-100T, MT-150W, MT-500B, MT-600B, MT-100F and MT-500HD manufactured by Tayca Corporation.; FINEX-25, BF-1, BF-10, BF-20 and ST-M manufactured by Sakai Chemical Industry Co.Ltd.; HZn and HZr3M manufactured by Hokkai Chemical Co.Ltd.; DEFIC-Y and DEFIC-R manufactured by Dowa Mining :Co.Ltd.; AS2BM and TiO2P25 manufactured by Nippon Aerosil Co.Ltd.; 100A and 500A manufactured by Ube Industries Co. Ltd.; and Y-LOP manufactured by Titan Kogyo K.K., and sintered products thereof.

To the magnetic layer of the present invention, a carbon black can be added. As for the carbon black used in the present invention, furnace black for rubbers, thermal for rubbers, black for coloring, acetylene black or the like can be used. It is preferable to have the specific surface area (Sbet) ranging from 5 to 500 m$^2$/g, the DBP oil absorption amount ranging from 10 to 400 ml/100 g, the particle diameter ranging from 5 to 300 nm, the pH ranging from 2 to 10, the moisture content ranging from 0.1 to 1.0% and the tap density ranging from 0.1 to 1.0 g/cc. Specific examples of the carbon black used in the present invention include BLACK PEARLS 2000, 1300, 1000, 900, 800, 700 and VULCAN XC-72 manufactured by Cabot Corporation; #80, #60 #55 , #50 and #35 manufactured by Asahi Carbon Co. Ltd.; #2400B, #2300, #5, #900, #950, #970, #1000, #30, #40 and #10B manufactured by Mitsubishi Kasei Kogyo Corp.; CONDUCTEX SC, RAVEN 150, 50, 40 and 15 manufactured by Columbia Carbon Co. Ltd. and the like. These carbon blacks may be ones surface-treated with a dispersant or grafted with resin, and ones whose surface has been partly graphitezed. Further, before added to a coating liquid, the carbon black may be dispersed in advance into the binder. These carbon blacks can be used alone or in combination. In the case of using carbon black, it is preferable to use in an amount ranging from 0.1 to 30% with respect to the ferromagnetic metal powder. The carbon black has functions in the magnetic layer to prevent static buildup, to reduce the friction coefficient, to lessen light-transmittance, or to improve strength for coating. These effects are different depending on kinds of carbon black. Therefore, it is, as a matter of course, possible in the present invention to properly use, as desired, carbon black different in kinds, amount and combination, according to the purpose, depending on the mentioned properties such as particle size, oil absorption amount, electrical conductivity, pH or the like. As for the examples of the carbon black usable in the magnetic layer of the present invention "Carbon Black Binran (Carbon Black Handbook)" edited by Carbon Black Association, for example, can be referred to.

Furthermore, if necessary, additives having a lubricant effect, an antistatic effect, a dispersing effect, a plasticizing effect or the like may be used. For example, usable are molybdenum disulfide; tungsten graphite disulfide; boron nitride; graphite fluoride; a silicone oil; silicones having a polar group; fatty acid-modified silicones; fluorine-containing silicones; fluorine-containing alcohols; polyolefins; polyglycols; alkylphosphoric esters and their alkali metal salts; alkylsulfuric esters and their alkali metal salts; polyphenyl ethers; fluorine-containing alkylsulfuric esters and their alkali metal salts; alcohols; fatty acid amides having a carbon number of 8 to 22; aliphatic amines having a carbon number of 8 to 22 and the like.

All or some of the additives used in the present invention may be added at any stage of the manufacturing process for the magnetic paint; for example, they may be mixed with the ferromagnetic metal powder before a kneading step; added at a kneading step for kneading the ferromagnetic metal powder, the binder and the solvent; added at a dispersing step; added after dispersing; or added immediately before coating. The purpose may be accomplished by coating: a part or all of the additives by simultaneous or sequential coating, after the magnetic coated layer is coated in accordance with the purpose. The lubricants may be coated on the surface of the magnetic layer depending on the purpose, after calendar processing or making slits.

If an organic phosphorus compound having a molecular weight equal to or less than 300is used as a additive, a binding force and a binding amount between the ferromagnetic metal powder and the binder of the present invention is further increased, resulting in improving dispersibility and reducing a head abrasive amount, or an amount of binders not absorbing to the ferromagnetic metal powder is further reduced, resulting in remarkably increasing durability of the magnetic recording medium .

As for these organic compounds, for example, compounds described in Japanese Unexamined Patent Publication (KOKAI) Heisei No. 1-189025, such as phenyl phosphoric acid of $C_6H_5OPO(OH)_2$, n-butyl phosphate of n-$C_4H_9OPO(OH)_2$, dibutyl phosphite of $(C_4H_9O)_2P(OH)$, phenylphosphonic acid of $C_6H_5PO(OH)_2$ and the like can be exemplified.

The thickness structure of the magnetic recording medium of the present invention usually consists of a nonmagnetic support having a thickness of from 1 to 100 μm, preferably from 4 to 12 μm, a magnetic layer usually having a thickness of from 0.1 to 5 μm, preferably from 1 to 4 μm, a backcoat layer usually having a thickness of from 0.1 to 2 μm, preferably from 0.4 to 1 μm and a adhesive layer for improving adhesion between the nonmagnetic support and the magnetic layer having a thickness of from 0.1 to 2 μm, preferably from 0.02 to 0.5 μm. Publicly known ones can be used as these adhesive layers and backcoat layers.

As for the nonmagnetic support used in the present invention, publicly known films such as polyethylene terephthalate, polyethylene naphthalate, polyamide, polyimide, polyamide imide, aromatic polyamide and polybenzoxidazol can be used. Especially, preferable are nonmagnetic supports using polyethylene terephthalate, polyethylene naphthalate or aramide resin.

These nonmagnetic supports may be subjected beforehand to corona discharge treatment, plasma treatment, treatment for enhancing adhesion, heat treatment, dust removal or the like. The object of the present invention can be accomplished by the nonmagnetic support having a surface roughness ranging from 2 to 30 nm, preferably from 5 to 25 nm, further preferably from 10 to 20 nm. In addition, it is preferable for these nonmagnetic supports not only to have a small center line average surface roughness but also to have no coarse projection having a height equal to or higher than 1 $\mu$m. In addition, shapes of surface roughness are freely controlled by sizes and amounts of fillers which are added, if necessary, to the nonmagnetic support. Examples of these fillers include oxides and carbonates of Al, Ca, Si, Ti or the like which are not asked whether it is crystallite or amorphous, and organic micro powders such as acryl based and melamine based. In addition, in order to attempting coexistence with running durability, it is preferable that roughness of a surface coated with a back layer is rougher than that of a surface coated with a magnetic layer.

The nonmagnetic support may have :either the same or different surface roughness between the surface coated with the magnetic layer and the surface coated with the back layer. If varying the roughness, a support having a dual structure may be used and a coating layer may be formed in order to varying the roughness.

The F-5 value of the nonmagnetic support used in the present invention is preferably from 70 to 300 MPa in both of a tape running direction and a width direction. The F-5 value in the tape longitudinal direction is normally higher than that in the tape width direction, however, it is not being limited if it is necessary that the strength, especially, in the width direction is enhanced. In addition, the thermal shrinkage of the nonmagnetic support in the tape running direction and in the tape width direction at 100° C. for 30 minutes is preferably equal to or less than 3%, further preferably equal to or less than 1.5%, and the thermal shrinkage at 80° C. for 30 minutes is preferably equal to or less than 1%, more preferably equal to or less than 0.5%. It is preferable that the break strength in the both directions is preferably from 50 to 1,000 Mpa and the modulus of elasticity is preferably from 1,00:0 to 20,000 MPa. In addition, the light-transmittance at the wavelength of 900 nm in the present invention is preferably equal to or less than 30%, further preferably equal to or less than 3%.

The object of the present invention can be accomplished by publicly known producing techniques; after preparing a magnetic paint, this is coated on the nonmagnetic support, and then it is orientated, followed by drying, thereafter, process for making a smooth surface is carried out, finally it is cut out at a certain width.

For preparing magnetic paints, magnetic paints are prepared by kneading and dispersing ferromagnetic powders, binders, carbon black, abrasives, antistatic agents, lubricants or the like usually with a solvent. As for solvents used in kneading and dispersing, solvents usually used for preparing magnetic paints, such as methyl ethyl ketone, toluene, butyl acetate, cyclohexanone can be used. The method for kneading and dispersing is not being limited if it is such a method as usually used for preparing magnetic paints. The order for adding each component can be properly set. Moreover, it may be done that a part of components is pre-dispersed in advance before added and it is finally mixed after separately dispersed.

Kneading machines usually used, such as a mill having two rollers, a mill having three rollers, a ball mill, a sand grinder, an attritor, a high-speed impeller dispersing machine, a high-speed stone mill, a high-speed impact mill, a disper, a kneader, a high-speed mixer, a homogenizer, an ultrasonic dispersing machine and the like are used. Details about techniques for kneading and dispersing are described in "Paint Flow and Pigment Dispersion" by T. C. Patton (John Wiley & Sons, 1964) and "Kogyo Zairyo" Vol.25, 37 (1977) authored by Shinichi Tanaka and the like, also in U.S. Pat. No. 2,581,414 and U.S. Pat. No. 2,855,515. Also in the present invention, magnetic paints can be prepared by kneading and dispersing corresponding to the method described in above references.

The magnetic paint thus prepared is coated on a aforementioned nonmagnetic support. In this case, the magnetic layer is coated as to have a layer thickness after drying preferably ranging from 0.05 to 10 $\mu$m, more preferably from 0.2 to 5.0 $\mu$m. At this time, in the case of a structure having multiple layers, several magnetic paints may be coated sequentially or simultaneously in multilayer coating. In addition, a nonmagnetic layer containing a nonmagnetic powder and a binder as main components may be formed between the magnetic layer and the nonmagnetic support. As for coating machines for coating aforementioned magnetic paints, usable are air doctor coat, blade coat, rod coat, extrusion coat, air knife coat, squeeze coat, impregnation coat, reverse roller coat, transfer roller coat, gravure coat, kiss coat, cast coat, spray coat, spin coat and the like. With respect to these, for example, "The latest coating technique" published by "Sogo Gijyutu Center" Co. Ltd.(May 31$^{st}$, 1983) can be referred to.

The coated layer with the magnetic paint thus coated is dried after the ferromagnetic powder contained in the coated layer with the magnetic paint is subjected to orientation process for magnetic field. For the orientation process for magnetic field, it is preferable to use a solenoid equal to or higher than 0.1 T and a cobalt magnet equal to or higher than 0.2 T in a manner that the same polarities of those above oppose to each other with the concurrent use. Furthermore, it is preferable to set a proper drying process in advance before the orientation so that the post-dry orientation characteristics show the highest.

A backcoat layer (backing layer) may be provided on the surface not coating magnetic paints of the nonmagnetic support. A backcoat layer is usually such a layer as provided by coating a paint for forming a backcoat layer in which granulated components such as an abrasive and an antistatic agent are dispersed with a binder in an organic solvent on the surface not coating magnetic paints of the nonmagnetic support. It is to be noted that an adhesive layer may be provided on the surface coated with magnetic paints and paints for forming a backcoat layer of the nonmagnetic support.

It is to be noted that coating the backcoat layer is preferably done after coating and drying the magnetic layer, however, it may be done before coating the magnetic layer or after process for making a smooth surface described below.

After forming and drying the coated layer, process for making a smooth surface is subjected. For the process for making a smooth surface, for example, super calender roller or the like is used. By carrying out the process for making a smooth surface, voids generated by removing a solvent in drying are disappeared, resulting in improving the filling density of the ferromagnetic powder in the magnetic layer, so that a magnetic recording medium having high electromagnetic characteristics can be obtained. As for the calender processing roller, various metal roller and plastic roller having heat-resistance such as epoxy, polyimide, polyamide, polyimide amide are used. As for conditions for calender process, calender rollers are operated under the conditions of a temperature ranging from 60 to 150° C., preferably from 70 to 130° C., especially preferably from 80 to 110° C., and a pressure ranging from 1000 to 5000 N/cm, preferably from 2000 to 4500 N/cm, especially preferably from 2500 to 4000 N/cm.

After the calender process, thermo-processing also can be performed. Such thermo-processing can be carried out at a temperature ranging from 40 to 80° C. for 6 to 120 hours.

Thereafter, it is cut out at a desired width with a cutting machine such as a slitter. Furthermore, after or before cutting out, the surface of the magnetic layer may be subjected to blade process with a sapphire knife or the like.

As for the magnetic characteristics of the magnetic recording medium of the present invention, if measuring at a magnetic field of 800 kA/m with a VSM (vibrating sample magnetometer), the squareness in the tape running direction is equal to or higher than 0.70, preferably equal to or higher than 0.75, further preferably from 0.80. The squareness in two directions perpendicular to the tape running direction is preferably equal to or less than 80% with respect to that in the running direction. The SFD of the magnetic layer is preferably equal to or less than 0.7, further preferably equal to or less than 0.6.

The coercive force Hc is a value which should be suitably set according to head materials and systems such as equalizing characteristics, however, usually equal to or higher than 110 kA/m, preferably equal to or higher than 125 kA/m. The reproduction output can be higher as the saturated magnetic flux density Bm is higher, however, the Bm is usually equal to or higher than 230 mT, preferably equal to or higher than 270 mT.

The surface roughness Ra of the magnetic layer is preferably from 1 nm to 10 nm, however, its value should be properly set according to the purpose. In order to obtain good electromagnetic characteristics, it is more preferable as the Ra is smaller. On the contrary, in order to obtain good running durability, it is, more preferable as the Ra is larger. The RMS surface roughness $R_{RMS}$ obtained from the evaluation by an AFM preferably ranges from 2 nm to 15 nm.

The friction coefficient with respect to SUS420J of the surface of the magnetic layer and its opposite surface in the magnetic recording medium of the present invention is preferably from 0.1 to 0.5, further preferably from 0.2 to 0.3. The surface resistivity is preferably from $10^4$ to $10^{12}$ Ω/sq. The modulus of elasticity at 0.5% elongation of the magnetic layer is preferably from 1,000 to 20,000 MPa in both the running and width directions. The modulus of elasticity of the magnetic recording medium is preferably from 1,000 to 15,000 MPa in both the running and width directions. The residual elongation is preferably equal to or less than 0.5%. The thermal shrinkage at any temperature of 100° C. or below is preferably equal to or less than 1%, further preferably equal to or less than 0.5%, the most preferably equal to or less than 0.1% and ideally 0%. The glass transition temperature (the temperature: at which the loss elastic modulus in a dynamic viscoelasticity measurement at 110 Hz becomes maximum) of the magnetic layer is preferably from 50° C. to 120° C.

The amount of the residual solvent contained in the magnetic layer is preferably equal to or less than 100 mg/m$^2$, further preferably equal to or less than 10 mg/m$^2$. The void percentage contained the magnetic layer is preferably equal to or less than 40% by volume and further preferably equal to or less than 30% by volume. Although a lower void percentage is preferable for attaining higher output, there are some cases in which a certain degree of void percentage is preferably ensured according to the purposes; for example, in the case of a magnetic recording medium for data recording putting an importance on the repeating use, higher void percentage in most cases bring about better running durability.

The magnetic recording medium of the present invention comprises at least one magnetic layer, however, it may have such a structure as to comprise multiple layers according to the purpose. In addition, a nonmagnetic layer containing at least a nonmagnetic powder and a binder may be provided between a magnetic layer and a nonmagnetic support. Then, it is easily presumed that several physical characteristics can be varied between each layer. For example, the magnetic layer is made to have a high elastic modulus to: improve running durability while the lower layer is made to have a lower elastic modulus than that of the magnetic layer to have better head touching of the magnetic recording medium.

EXAMPLES

Specific examples of the present invention will be explained below, however, the present invention is not being limited by the following examples. It is to be noted that a representation of "parts" in the examples means "parts by weight".

Preparation of Magnetic Tape

Magnetic Layer Composition 100 parts of the ferromagnetic magnetic powder A-1 (referring to Table 1) was ground for 10 minutes with an open kneader. Next, the following components were added and then kneaded for 60 minutes;

| | |
|---|---|
| Carbon black | 2 parts |
| (average particle diameter of 80 nm) | |
| Vinyl chloride resin | 10 parts |
| (MR-110 manufactured by Nippon Zeon Co. Ltd.) | |
| Polyurethane | 6 parts |
| (UR-8300 manufactured by Toyobo Co. Ltd.) | (solid substance) |
| Methyl ethyl ketone/Cyclohexanone = 1/1 | 60 parts. |
| With operating the open kneader, | |
| Methyl ethyl ketone/Cyclohexanone = 1/1 | 200 parts |
| were added to this kneaded product. Next, | |
| α-Al$_2$O$_3$ | 15 parts |
| (average particle diameter of 0.18 μm) | |
| was added and dispersed with a sand grinder for 120 | |
| minutes. | |

Furthermore, the following components were added and mixed with stirring for 20 minutes.

| | |
|---|---|
| Polyisocyanate | 4 parts |
| (Coronate 3041 manufactured by Nippon Polyurethane Industry Co., Ltd.) | (solid substance) |
| Stearic acid | 1 part |
| Fatty acid ester B-1 (referring to Table 2) | 2 parts |
| Stearic acid amide | 0.2 parts |
| Toluene | 50 parts. |

Thereafter, the mixture was filtered using a filter having a mean pore diameter of 1 μm, thereby a magnetic paint was prepared.

The magnetic paint thus obtained was coated in such an amount as to form a thickness after dried of 2.5 μm with an extrusion coating head on a surface of a PET support having a thickness of 10.5 μm. While the magnetic paint was still in a wet state, magnetic field orientation is carried out with a magnet having a magnetic force of 0.3 T, followed by drying. Further, a liquid for a backcoat layer described below was coated in such an amount as to have a thickness after dried of 0.5 μm, followed by drying.

| | |
|---|---|
| Carbon black | 100 parts |
| (particle diameter of 18 nm) | |
| Nitrocellulose | 60 parts |
| (HIG1/2 manufactured by Asahi Chemical Industry Co. Ltd.) | |
| Polyurethane | 60 parts |
| (N-2301 manufactured by Nippon Polyurethane Industry Co., Ltd.) | |
| Polyisocyanate | 20 parts |
| (Coronate L manufactured by Nippon polyurethane Industry Co., Ltd.) | |
| Methyl ethyl ketone | 1000 parts |
| Toluene | 1000 parts |

Thereafter, calendering process was done by passing through six nips, each of which comprising metal rollers and heat-resistant plastic rollers under the condition at a speed of 200 m/min, a linear pressure of 3000 N/cm and a temperature of 85° C.

The roll thus obtained was subjected to thermo-process at 65° C. for 24 hours, and then slitting it in a width of ½ inches at a speed of 200 m/min.

Furthermore, the magnetic tape after slitting was subjected to blade process with a lapping tape (MS-20000 manufactured by Fuji Photo Film Co. Ltd.) at a sending tension of 40 g per a width of ½ inches, thereby obtaining the magnetic tape described in Example 1.

Similarly, with using ferromagnetic metal powders A-1 to A-6 (referring to Table 1) and fatty acid esters B-1 to B-5 (referring to Table 2), magnetic tapes described in Examples 1 to 5 and Comparative Examples 1 to 5 were produced (referring to Table 3).

It is to be noted that the acid-hydrolytic speed described in Table 2 was measured as follows; 10 mmol/l of a fatty acid ester of the sample was added to 0.1 N HCl in a mixture solvent of aceton and water (20:1 by volume), followed by sampling it at certain intervals. The concentration of the sample solvent was measured by a gas chromatography with an internal standard method. As representing a primary concentration as $C_0$ and a sample concentration after time t passed as C, a linear relationship was obtained between $1n(C/C_0)$ and t. The acid-hydrolytic speed was obtained by the constant k in $1n(C/C_0)=t$.

TABLE 1

| | | Ferromagnetic metal powder | | | | | |
|---|---|---|---|---|---|---|---|
| | | A-1 | A-2 | A-3 | A-4 | A-5 | A-6 |
| composition at. % | Al/Fe | 10 | 6 | 15 | 5 | 3 | 10 |
| | Co/Fe | 3 | 4.5 | 20 | 4.5 | 3 | 3 |
| | Y/Fe | 3 | 4 | 1 | 4 | 2 | 0.1 |
| | Si/Fe | 0.01 | 0 | 0.03 | 0.8 | 7 | 0.01 |
| | Nd/Fe | 0.01 | 0.05 | 0.02 | 0 | 0 | 3 |
| water-soluble Na (ppm/g) | | 5 | 3 | 0 | 12 | 80 | 7 |
| water-soluble Ca (ppm/g) | | 3 | 0 | 4 | 0 | 5 | 2 |
| Length of major axis (μm) | | 0.15 | 0.18 | 0.11 | 0.16 | 0.13 | 0.16 |
| Length of minor axis (μm) | | 0.020 | 0.018 | 0.016 | 0.016 | 0.015 | 0.020 |

TABLE 2

| | | | Fatty acid ester | | |
|---|---|---|---|---|---|
| | Name | Molecular formula | | Melting point (° C.) | Acid-hydrolytic speed |
| B-1 | 2-ethyl-hexyl stearate | $C_{17}H_{35}COO.CH_2CH(C_2H_5)C_4H_9$ | | 0 | 0.020 |
| B-2 | 2-hexyl-decyl stearate | $C_{17}H_{35}COO.CH_2CH(C_6H_{13})C_8H_{17}$ | | 2 | 0.019 |
| B-3 | 3-methyl-butyl stearate | $C_{17}H_{35}COO.C_2H_4CH(CH_3)CH_3$ | | 10 | 0.028 |
| B-4 | Butoxy-ethyl stearate | $C_{17}H_{35}COO.C_2H_4OC_4H_9$ | | 10 | 0.049 |
| B-5 | 1-methyl-butyl stearate | $C_{17}H_{35}COO.CH(CH_3)C_2H_5$ | | 22 | 0.010 |

TABLE 3

List of Examples and Comparative Examples

| | Magnetic powder (contained atom at. %) | Al/Fe | Co/Fe | Y/Fe | Si/Fe | Nd/Fe | Ester | AS | MP (° C.) |
|---|---|---|---|---|---|---|---|---|---|
| Ex. 1 | A-1 | 10 | 3 | 3 | 0.01 | 0.01 | B-1 | 0.020 | 0 |
| Ex. 2 | A-1 | 10 | 3 | 3 | 0.01 | 0.01 | B-2 | 0.019 | 2 |
| Ex. 3 | A-1 | 10 | 3 | 3 | 0.01 | 0.01 | B-3 | 0.028 | 10 |
| Ex. 4 | A-2 | 6 | 4.5 | 4 | 0 | 0.05 | B-1 | 0.020 | 0 |
| Ex. 5 | A-3 | 15 | 20 | 1 | 0.03 | 0.02 | B-1 | 0.020 | 0 |
| Comp. Ex. 1 | A-4 | 5 | 4.5 | 4 | 0.8 | 0 | B-1 | 0.020 | 0 |

TABLE 3-continued

List of Examples and Comparative Examples

| | Magnetic powder (contained atom at. %) | Al/Fe | Co/Fe | Y/Fe | Si/Fe | Nd/Fe | Ester | AS | MP (° C.) |
|---|---|---|---|---|---|---|---|---|---|
| Comp. Ex. 2 | A-5 | 3 | 3 | 2 | 7 | 0 | B-1 | 0.020 | 0 |
| Comp. Ex. 3 | A-6 | 10 | 3 | 0.1 | 0.01 | 3 | B-1 | 0.020 | 0 |
| Comp. Ex. 4 | A-1 | 10 | 3 | 3 | 0.01 | 0.01 | B-4 | 0.049 | 10 |
| Comp. Ex. 5 | A-1 | 10 | 3 | 3 | 0.01 | 0.01 | B-5 | 0.010 | 22 |

Note)
AS: Acid-hydrolytic speed of ester,
MP: Melting point of ester

The magnetic tape thus obtained was incorporated in a cassette half for D-3 systems with a 94-minute length, and then the following measurement was carried out.

Running performance A: After recording/reproducing color bar signals in the test tape under the circumstance of 25° C. and 50% RH with VTR AJ-D350 manufactured by Matsushita Electric Industry Co., Ltd. it was preserved under the circumstance of 60° C. and 90% RH for four weeks. The tape after preserved was reproduced with aforementioned VTR.

Running performance B: The test tape was subjected to recording operation under the circumstance of −20° C. with Camcoder AJ-D300 manufactured by Matsushita Electric Industry Co., Ltd. Subsequently, the test tape was reproduced under the circumstance of 25° C. and 50% RH with VTR AJ-D350 manufactured by Matsushita Electric Industry Co., Ltd.

These test results were shown in the following table.

From the following table, the magnetic recording media of the present invention are excellent in all evaluated characteristics, however, those of Comparative Examples are inferior in any of said characteristics. Therefore, it is found out that the examples of the present invention are superior to the comparative examples.

TABLE 4

List of the test results

| | Magnetic powder | Ester | Running Performance A |
|---|---|---|---|
| Ex.1 | A-1 | B-1 | No problem* |
| Ex.2 | A-1 | B-2 | No problem* |
| Ex.3 | A-1 | B-3 | No problem* |
| Ex.4 | A-2 | B-1 | No problem* |
| Ex.5 | A-3 | B-1 | No problem* |
| Comp. Ex.1 | A-4 | B-1 | Reproduction output was gradually reduced in reproducing. (Compared with that in starting reproduction, it was reduced to about 4 dB.) |
| Comp. Ex.2 | A-5 | B-1 | Reproduction output disappeared at about 78 minutes passed in reproducing. Stains adhered at head gaps. |
| Comp. Ex.3 | A-6 | B-1 | Reproduction output was gradually reduced in reproducing. (Compared with that in starting reproduction, it was reduced to about 5 dB. |
| Comp. Ex.4 | A-1 | B-4 | Running stopped at about 63 minutes passed in reproducing. |
| Comp. Ex.5 | A-1 | B-5 | No problems* |

TABLE 4-continued

List of the test results

| | Magnetic powder | Ester | Running Performance A |
|---|---|---|---|
| Ex.1 | A-1 | B-1 | No problem** |
| Ex.2 | A-1 | B-2 | No problem** |
| Ex.3 | A-1 | B-3 | No problem** |
| Ex.4 | A-2 | B-1 | No problem** |
| Ex.5 | A-3 | B-1 | No problem** |
| Comp. Ex.1 | A-4 | B-1 | No problems** |
| Comp. Ex.2 | A-5 | B-1 | No problems** |
| Comp. Ex.3 | A-6 | B-1 | No problems** |
| Comp. Ex.4 | A-1 | B-4 | No problems** |
| Comp. Ex.5 | A-1 | B-5 | Running stopped at about 40 minutes passed in recording. |

Note
No problem*: Reduction of reproduction output, stains at head gaps are not observed.
No problems**: Running did not stop.

What is claimed is:

1. A magnetic recording medium comprising a nonmagnetic support having thereon, a magnetic layer containing a ferromagnetic metal powder, a fatty acid, a fatty acid ester having a melting point that is equal to or less than 15° C. and a binder, wherein said ferromagnetic metal powder comprises Fe and 5 to 15% by atom of Al, 1 to 25% by atom of Co, 0.5 to 5% by atom of Y, 0 to 0.1% by atom of Si and 0% 0.1% by atom of Nd, based on Fe, water-soluble Na in an amount ranging from 0 to 10 ppm and water-soluble Ca in an amount ranging from 0 to 10 ppm, per 1 g of said ferromagnetic metal powder, and wherein said fatty acid ester is a fatty acid alkyl ester having an acid-hydrolytic speed equal to or less than 0.03/hour.

2. The magnetic recording medium of claim 1, wherein said ferromagnetic metal powder comprises Co in an amount ranging from 1 to 5% by atom based on Fe.

3. The magnetic recording medium of claim 1, wherein said ferromagnetic metal powder comprises 7 to 13% by,atom of Al based on Fe.

4. The magnetic recording medium of claim 1, wherein said ferromagnetic metal powder has a mean length of major axis ranging from 0.05 to 0.25 μm.

5. The magnetic recording medium of claim 1, wherein said ferromagnetic metal powder has a mean length of major axis ranging from 0.1 to 0.2 μm.

6. The magnetic recording medium of claim 1, wherein said ferromagnetic metal powder has a specific surface area ranging from 40 to 60 $m^2/g$, a crystallite size ranging from 12 to 22 nm, a saturation magnetization ranging from 100 to 180 emu/g and a moisture content ranging from 0.1 to 2.0% by weight.

7. The magnetic recording medium of claim 1, wherein said fatty acid alkyl ester is represented by $R^1COOR^2$, wherein $R^1$ represents a straight-chain saturated or unsaturated hydrocarbon group: and $R^2$ represents a branched saturated or unsaturated hydrocarbon group.

8. The magnetic recording medium of claim 1, wherein said fatty acid ester is selected from the group consisting of 2-ethylhexyl stearate, 2-hexyldecyl stearate, 3-methylbutyl stearate, 1-methylbutyl stearate, 2-ethylhexyl myristate, 2-hexyldecyl myristate, 3-methylbutyl myristate and 1-methylbutyl myristate.

9. The magnetic recording medium of claim 1, wherein said fatty acid is a monobasic fatty acid having a carbon number of 10 to 24.

10. The magnetic recording medium of claim 1, wherein said fatty acid is selected from the group consisting of lauric acid, myristic acid, palmitic acid, stearic acid, behenic acid, oleic acid, linoleic acid, linolenic acid and elaidic acid.

11. The magnetic recording medium of claim 1, wherein said binder comprises a vinyl chloride resin, a polyurethane resin and a polyisocyanate.

12. The magnetic recording medium of claim 1, wherein said magnetic layer further comprises at least one nonmagnetic powder having an average particle diameter ranging from 0.05 to 0.4 µm and being selected from the group consisting of $Al_2O_3$, $Cr_2O_3$, $Fe_2O_3$, $ZrO_2$ and $TiO_2$.

13. The magnetic recording medium of claim 1, wherein said medium further comprises a backcoat layer on the surface of said support opposite to the surface on which said magnetic layer is provided.

14. The magnetic recording medium of claim 1, wherein said acid-hydrolytic speed means "k" in supposing an artificial primary reaction speed from the equation InCo/C=kt, wherein C represents a primary concentration and Co represents a concentration after a time t has passed, at a hydrolytic speed in 0.1N-HCl/water/aceton at 40° C.

15. The magnetic recording medium of claim 1, wherein said magnetic layer further comprises a carbon black.

16. The magnetic recording medium of claim 15, wherein said carbon black has a specific surface area ranging from 5 to 500 $m^2/g$ and a DBP absorption amount ranging from 10 to 400 ml/100 g.

\* \* \* \* \*

UNITED STATES PATENT AND TRADEMARK OFFICE
CERTIFICATE OF CORRECTION

PATENT NO. : 6,506,486 B1
DATED : January 14, 2003
INVENTOR(S) : Hiroaki Araki et al.

It is certified that error appears in the above-identified patent and that said Letters Patent is hereby corrected as shown below:

<u>Column 18,</u>
Line 49, "0%" should read -- 0 to --.

Signed and Sealed this

Seventeenth Day of June, 2003

JAMES E. ROGAN
*Director of the United States Patent and Trademark Office*